United States Patent [19]

Bucher et al.

[11] Patent Number: 4,696,190
[45] Date of Patent: Sep. 29, 1987

[54] TUBE STRAIGHTNESS CHECKING APPARATUS

[75] Inventors: George D. Bucher, Allison Park; John A. Catanese, Seward; William D. Clawson, Burrell Township, Indiana County, all of Pa.

[73] Assignee: Westinghouse Electric Corp., Pittsburgh, Pa.

[21] Appl. No.: 775,210

[22] Filed: Sep. 12, 1985

[51] Int. Cl.⁴ .............................. G01B 5/20; G01B 7/28
[52] U.S. Cl. ................................. 73/865.8; 33/533; 340/540
[58] Field of Search ............... 73/432 G, 432 R, 37.8, 73/622, 432 V; 367/129; 340/540; 33/533; 72/34

[56] References Cited

U.S. PATENT DOCUMENTS

| | | | |
|---|---|---|---|
| 2,389,206 | 11/1945 | McKinney et al. | 33/533 X |
| 3,568,485 | 3/1971 | Mandula, Jr. | 33/533 |
| 3,846,998 | 11/1974 | Lock | 72/34 |
| 3,875,667 | 4/1975 | Wilke | 33/533 |
| 3,896,662 | 7/1975 | Camp et al. | 73/622 |
| 3,944,963 | 3/1976 | Aively | 73/626 X |
| 4,155,172 | 5/1979 | Bartol | 33/533 |
| 4,201,476 | 5/1980 | Musto et al. | 356/386 |
| 4,203,308 | 5/1980 | Davis | 72/34 |
| 4,203,673 | 5/1980 | Buckson | 250/224 X |
| 4,404,853 | 9/1983 | Livingston | 73/622 |

FOREIGN PATENT DOCUMENTS

| | | | |
|---|---|---|---|
| 379827 | 8/1923 | Fed. Rep. of Germany | 72/34 |
| 2207336 | 8/1973 | Fed. Rep. of Germany | 72/34 |
| 4013 | 1/1981 | Japan | 340/540 |
| 169014 | 10/1983 | Japan | 73/622 |
| 648835 | 2/1979 | U.S.S.R. | 73/432 G |

*Primary Examiner*—Stewart J. Levy
*Assistant Examiner*—Tom Noland

[57] ABSTRACT

A tube straightness checking apparatus includes a gauging mechanism disposed along a linear path and being operable to check the straightness of the tube as it is moved along the path past the mechanism. The gauging mechanism is operable to detect deviation of the tube from an imaginary centerline which is generally coincident with the linear path. The apparatus also includes linear hearing sets which guide a tube along the generally linear path past the gauging mechanism. Two embodiments of the gauging mechanism are disclosed. In the preferred embodiment, the gauging mechanism includes a gauge plate with a circular gauging orifice defined therein through which the tube passes as it is moved along the linear path. The gauge plate is electrically conductive and forms part of an electric circuit which is operable to provide an indication of an out-of-straightness condition upon the tube contacting the gauge plate as the tube moves along the linear path through the gauging orifice of the plate. In an alternative embodiment, the gauging mechanism includes a pair of orthogonally arranged analog proximity sensors disposed along the linear path and being operable to detect deviation of the tube from the imaginary centerline as the tube moves past the sensors along the linear path.

13 Claims, 8 Drawing Figures

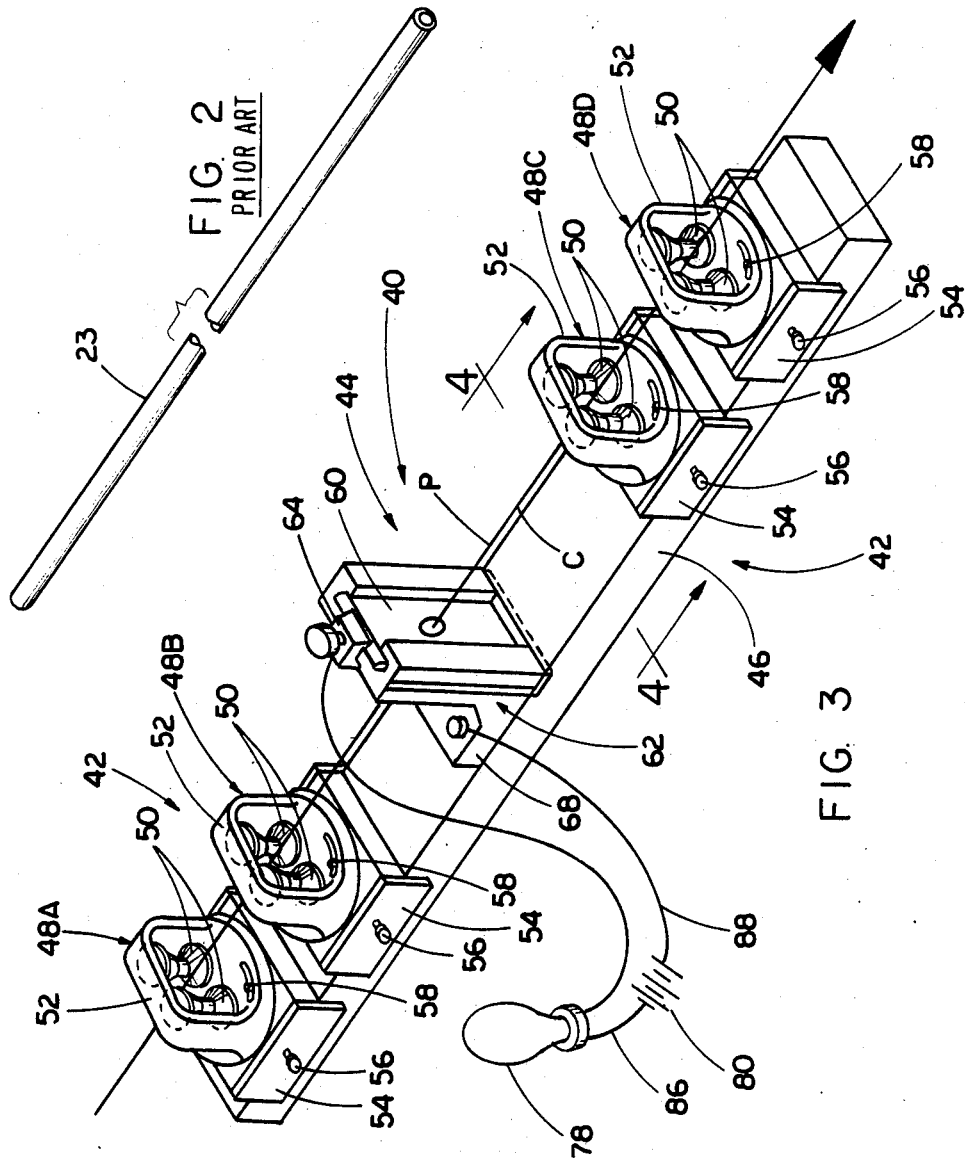

TUBE STRAIGHTNESS CHECKING APPARATUS

BACKGROUND OF THE INVENTION

1. Field of the Invention

The present invention relates generally to fuel assemblies for nuclear reactors and, more particularly, is concerned with an apparatus for checking the straightness of fuel rod tubes during several stages of tube manufacture.

2. Description of the Prior Art

In most nuclear reactors, the reactor core is comprised of a large number of elongated fuel assemblies. Conventional designs of these fuel assemblies include a multiplicity of fuel rods held in an organized array by grids spaced along the fuel assembly length. The grids are attached to a plurality of control rod guide thimbles. Top and bottom nozzles on opposite ends of the fuel assembly are secured to the guide thimbles which extend above and below the opposite ends of the fuel rods.

The tubes of the fuel rods and guide thimbles are contained within a typical fuel assembly in a closely packed aray in which the tubes are precisely spaced from each other. Optimum performance of the reactor core depends upon uniformity of the gaps between the tubes. And, thus in the manufacture of these tubes, much attention is devoted to ensuring that they are as straight as possible.

During tube manufacture, the current practice has been to perform straightening of all tubes by using a machine after final tube reduction and annealing stages but without previously determining their straightness. The straightness is checked immediately thereafter on a sampling basis by rolling the sampled tube across a table surface and using a feeler gauge to measure the maximum gap that occurs between the tube and the table surface. It is normally required that the gap not exceed 0.010 inch in a span of twelve inches of tube length. A second inspection of tube straightness is carried out for all tubes just prior to packing.

An important disadvantage of the current practice is that tube straightness is not checked until after completion of the stages of manufacture of the sampled tube. It would be most beneficial to know straightness at several stages of tube manufacture. First, a check of tubes entering the pilgering operation (i.e. elongation of a tube to a finished size over a stationary mandrel through effecting a reduction in both the diameter and wall thickness of the tube by means of two grooved dies which embrace the tube from above and below and roll in a constant cycle back and forth along the tube) would detect hooked tubes and prevent costly "wrecks" currently experienced from time to time. Additionally, an in-process check for straightness during the final pilgering operation would be useful to verify that the pilger die and mandrel relationships are correct. Next, a straightness check after final annealing would avoid the hazards of unnecessary straightening (end damage, cold work and crushing) and contribute to improved efficiency and yield. Finally, it would be useful to check tubes just prior to carrying out the standard ultrasonic test where out-of-straightness conditions are accentuated by the high rotational speeds and hamper the accuracy and reliability of the inspection process.

Consequently, a need exists for an alternative approach to tube straightness checking which facilitates realization of the benefits outlined above in a simple, low-cost and reliable manner.

SUMMARY OF THE INVENTION

The present invention provides a tube straightness checking apparatus designed to satisfy the aforementioned needs. First, the present invention provides a practical low-cost means of checking tube straightness at various process stages for early detection of adverse conditions for improved yield and quality and prevention of pilger "wrecks". Further, the apparatus provides a visual (lamp) indication upon discovery of an out-of-specification condition permitting in-process checks by unskilled personnel. Also, the apparatus is adjustable to accommodate the entire range of fuel tube diameters, and is low-cost and compact, utilizing commercially-available components.

Accordingly, the present invention is directed to an apparatus for checking the straightness of tubes, comprising: (a) means for receiving and guiding a tube along a generally linear path; and (b) a gauging mechanism disposed along the linear path and being operable to check the straightness of the tube as it is moved along the path past the mechanism. The gauging mechanism is operable to detect deviation of the tube from an imaginary centerline which is generally coincident with the linear path.

More particularly, the present invention covers two embodiments of the gauging mechanism. In a preferred embodiment, the gauging mechanism includes a gauge plate with a circular gauging orifice defined therein through which the tube passes as it is moved along the linear path. The gauging orifice has a center aligned coincident with the imaginary centerline of the tube and is of a predetermined diametric size which establishes the out-of-straightness tolerance for the tube. Also, this embodiment of the gauging mechanism includes a holder member which releasably mounts the gauge plate across the linear path whereby the gauge plate can be interchanged with other plates having circular orifices of different diametric sizes for checking the straightness of tubes of different diameter sizes. An electrical circuit is included having indicating means operable to provide an indication of the detection of an out-of-straightness condition. Also, the gauge plate is electrically conductive and forms part of the electric circuit such that the indicating means is operated to provide the out-of-straightness indication upon the tube contacting the gauge plate as the tube moves along the linear path through the gauging orifice of the plate.

In the alternative embodiment, the gauging mechanism includes a pair of orthogonally arranged analog proximity sensors disposed along the linear path. The sensors are operable to detect deviation of the tube from the imaginary centerline as the tube is moved past the sensors along the linear path. Support members are provided for adjustably supporting the sensors.

Still further, the tube receiving and guiding means of the tube straightness checking apparatus includes a plurality of sets of bearings, some of which are disposed on a tube entry side of the gauging mechanism and others of which are disposed on a tube exit side of the gauging mechanism. The bearing sets together define the linear path along which the tube is guided past the gauging mechanism. Each of the bearing sets is in the form of a set of linear bearings being adjustable by rotation of the set as a unit in order to accommodate tubes of different diameter sizes. Also, a base is provided on which is mounted the gauging mechanism and also the bearing sets in spaced apart relationship therealong and on the respective tube entry and exit sides of the mechanism.

These and other advantages and attainments of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the course of the following detailed description, reference will be made to the attached drawings in which:

FIG. 2 is a perspective view of a typical fuel rod tube at some stage of its manufacturing process where the tube will be passed through the straightness checking apparatus of the present invention.

FIG. 3 is a perspective view of the preferred embodiment of the tube straightness checking apparatus of the present invention, wherein a go-nogo gauging mechanism is utilized.

DETAILED DESCRIPTION OF THE INVENTION

Figure 1:
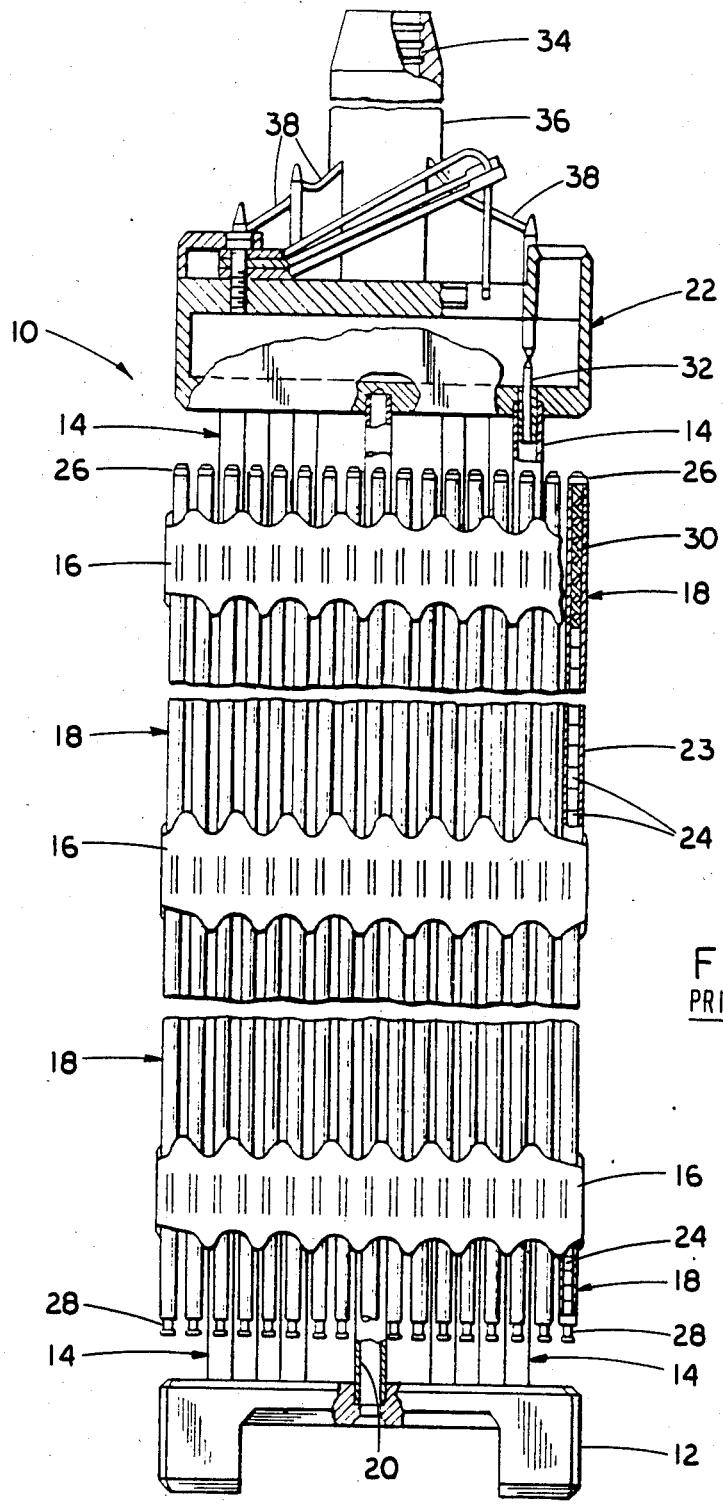
FIG. 1 is an elevational view, foreshortened and partly in section, of a nuclear fuel assembly containing fuel rods and guide thimbles composed of tubes whose straightness can be checked during the various stages in their manufacture in accordance with the principles of the present invention.

In the following description, like reference characters designate like or corresponding parts throughout the several views. Also in the following description, it is to be understood that such terms as "forward", "rearward", "left", "right", "upwardly", "downwardly", and the like, are words of convenience and are not to be construed as limiting terms.

In General

Referring now to the drawings, and particularly in FIG. 1, there is shown an elevational view of a PWR fuel assembly, represented in vertically foreshortened form and being generally designated by the numeral 10. Basically, the fuel assembly 10 includes a lower end structure or bottom nozzle 12 for supporting the assembly on the lower core plate (not shown) in the core region of a reactor (not shown), and a number of longitudinally extending guide tubes or thimbles 14 which project upwardly from the bottom nozzle 12. The assembly 10 further includes a plurality of transverse grids 16 axially spaced along the guide thimbles 14 and an organized array of elongated fuel rods 18 transversely spaced and supported by the grids 16. Also, the assembly 10 has an instrumentation tube 20 located in the center thereof and an upper end structure or top nozzle 22 attached to the guide thimbles 14 to form an integral assembly capable of being conventionally handled without damaging the assembly parts.

As mentioned above, the fuel rods 18 in the array thereof in the assembly 10 are held in spaced relationship with one another by the grids 16 spaced along the fuel assembly length. Each fuel rod 18 includes an elongated hollow tube 23 which contains nuclear fuel pellets 24 and is closed at its opposite ends by upper and lower end plugs 26,28 to hermetically seal the rod. Commonly, a plenum spring 30 is disposed in the tube 23 between the upper end plug 26 and the pellets 24 to maintain the pellets in a tight, stacked relationship within the rod 18. The fuel pellets 24 composed of fissile material are responsible for creating the reactive power of the nuclear reactor. A liquid moderator-coolant such as water, or water containing boron, is pumped upwardly through the guide thimbles 14 and along the fuel rods 18 of the fuel assembly 10 in order to extract heat generated therein for the production of useful work.

To control the fission process, a number of control rods 32 are reciprocally movable in the guide thimbles 14 located at predetermined positions in the fuel assembly 10. Specifically, a rod cluster control mechanism 34 associated with the top nozzle 22 has an internally threaded cylindrical member 36 with a plurality of radially extending flukes or arms 38. Each arm 38 is interconnected to a control rod 32 such that the control mechanism 34 is operable to move the control rods 32 vertically in the guide thimbles 14 to thereby control the fission process in the fuel assembly 10, all in a well-known manner.

Tube Straightness Checking Apparatus

During manufacture of the fuel rod tube 23 of FIG. 2, it makes several passes through conventional pilger equipment (not shown). Each stage of the equipment employs a stationary mandrel and a pair of grooved dies. The two dies engage the tube from above and below as it is positioned on the mandrel, and by rolling in a constant cycle back and forth along the tube, they cause a reduction in both the diameter and wall thickness of the tube.

As mentioned earlier, it would be advantageous to be able to check the straightness of the tube 23 upstream of the pilger equipment as well as between passes of the tube through the successive stages of the equipment. The tube straightness checking apparatus, generally designated 40 and being shown in FIGS. 3 to 7, is adapted to accommodate such objective. The apparatus 40 is compact and does not utilize tube rotation as it performs the straightness check. Thus, it can be interfaced with a simple Vee trough system for manual through feed as a process overcheck. Also, by using conventional motor-driven pinch rolls, feeding of the tubes through the apparatus 40 can readily be automated. Further, it is possible to adapt the apparatus 40 for incorporation directly in line with operations such as tube pilgering and straightening that generate slow rotation of the tube 23 and precede final surface conditioning of the tube.

Figure 6:
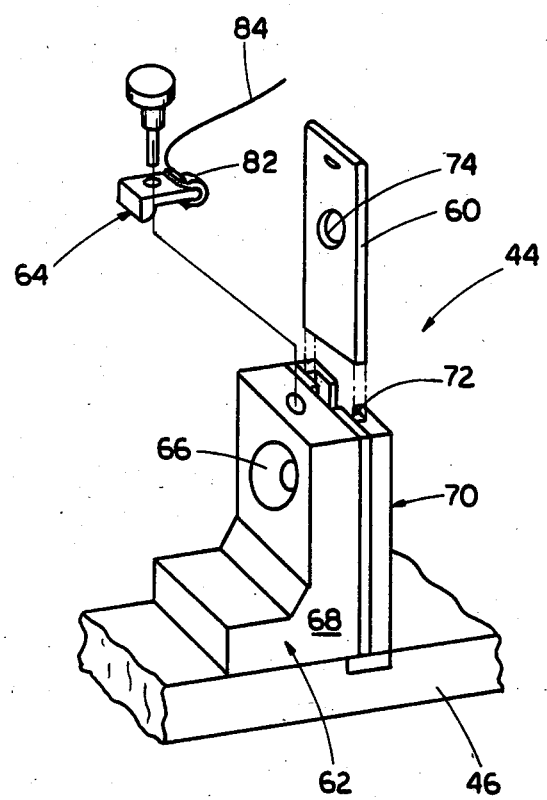
FIG. 6 is an enlarged exploded perspective view of the go-nogo gauging mechanism utilized in the apparatus of FIG. 3.

Referring to FIGS. 3 and 6, there is seen a preferred embodiment of the tube straightness checking apparatus 40, being basically composed of means, generally indicated by the numeral 42, for receiving and guiding the tube 23 along a generally linear path P, and a gauging mechanism, generally designated 44, which is disposed along the linear path and operable to check the straightness of the tube 23 as it is moved along the path past the mechanism. The preferred embodiment of the apparatus 40, as seen in FIGS. 3 and 6, incorporates what is termed a "go-nogo" type of gauging mechanism 44, whereas an alternative embodiment of the apparatus 40, depicted in fragmentary form in FIG. 7, incorporates a gauging mechanism 44', being generally referred to as a "precision measurement" type. The "go-nogo" gauging mechanism 44 will be described shortly, with the other type being described later toward the end of this detailed description of the invention. However, either of the two embodiments of the gauging mechanism 44,44' is operable to detect deviation of the tube 23 from an imaginary centerline C which is generally coincident with the linear path P and is employed with the same means 42 for receiving and guiding the tube 23 along the linear path which will be described in detail first.

The tube receiving and guiding means 42 includes an elongated base 46 on which is centrally mounted the gauging mechanism 44 and also a plurality of sets of bearings, each being designated by the numeral 48. The bearing sets 48 are disposed in spaced apart relationship along the base 46, with some of the bearing sets 48A,48B being disposed upstream on a tube entry side of the gauging mechanism 44 and other of the sets 48C,48D being disposed downstream on a tube exit side of the mechanism. Together, the bearing sets 48 define the linear path P along which the tube 23 is guided past the gauging mechanism 44.

Figure 5:
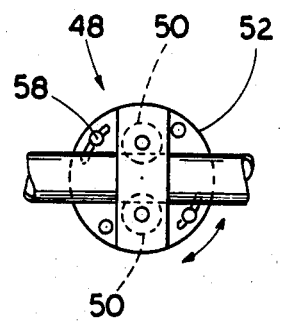
FIG. 5 is a plan view of the one set of adjustable linear bearings as seen along line 5—5 of FIG. 4, the bearing set being rotated ninety degrees from its position in FIG. 4.
Figure 4:
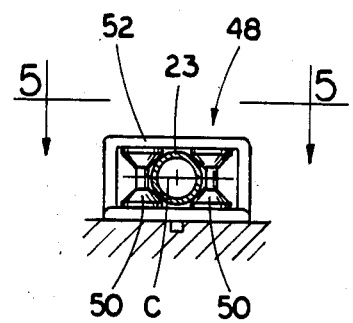
FIG. 4 is an enlarged side elevational view as seen along line 4—4 of FIG. 3, showing one of the four sets of adjustable linear bearings used in the apparatus of FIG. 3 for guiding the tube to be checked along a linear path through the gauging mechanism of the apparatus.

More specifically, also referring to FIGS. 4 and 5, the bearing sets 48, preferably being four in number, are each in the form of a set of linear bearings which are composed of two rollers 50 mounted in a housing bracket 52 which, in turn, is mounted to a platform 54 being connected to the base 46. By untightening set screws 56, the respective positions of the platforms 54 along the base 46 can be changed. Also, to accommodate tubes of different diameter sizes, the angular position about a vertical axis of the rollers 50 of each set 48 can be changed as a unit by adjustment of set screws 58 and by rotation of the respective brackets 52.

In one practical embodiment, each roller 50 is approximately one inch in its major diameter and has sides recessed at forth-five degrees so that two rollers together provide four points of tangential contact with the tube 23. A one-inch major diameter is recommended to provide a sufficient envelope to capture misaligned or hooked tubes and guide them through the apparatus 40. The roller material can be 300 Series stainless steel, high density polyurethane, nylon or other approved material. The roller contains an integral shaft running in precision ball bearings (not shown) mounted in the housing bracket 52. Tube diameter size changeover is readily accomplished by inserting a straight bar or master of the appropriate diameter between the rollers 50, rotating the housing bracket 52 until the desired fit is obtained, and then tightening the adjustment screws 58. The pass centerline C of the tube 23 will not change through the guiding means 42. Although the normal span between the roller sets 48B,48C on either side of the gauging mechanism 44 is twelve inches, the bearing sets can be moved as needed by adjustment of screws 56.

The "go-nogo" gauging mechanism 44 of the apparatus 40, as seen in FIGS. 3 and 6, includes a gauge plate 60, a holder member 62 for the plate 60 which is attached at a central location on the base 46 and a retainer member 64 which attaches to the top surface of the holder member 62 and overlies the plate 60 so as to retain it in a desired stationary position in the holder member. The holder member 62, has an opening 66 with a conical shape defined on the upstream side of an angle support bracket 68 through which the tube 23 will travel along the linear path P. In one example, the opening narrows to 0.510 inch at the throughpoint. The purpose of the conical opening 66 is to accept hooked or distorted tubes and guide them through the center where straightness gauging or checking occurs. The holder member 62 also includes a plate holder 70 composed of electrically insulating material and mounted on the downstream side of the angle support bracket 68 which defines a slot 72 open at the top. The support bracket 68 is electrically conductive, being preferably made from 300 Series stainless steel.

The gauge plate 60 is provided with a circular gauging orifice 74 centrally defined therein and through which the tube 23 passes as it is moved along the linear path P. The gauging orifice 74 has a center aligned coincident with the imaginary centerline C of the tube 23. The diametric size of the gauging orifice 74 establishes the amount of out-of-straightness tolerance for the respective diameter size of the tube. For example, a 0.010 inch maximum allowable deviation from straightness for each twelve inches of tube length would require utilization of an orifice 0.020 inch greater than the nominal tube diameter.

The plate holder 70 of the holder member 62 is adapted to releasably mount the gauge plate 60 within the slot 72 and across the linear path P. By removal of the retainer member 64, the gauge plate 60 can be withdrawn from the slot 72 and interchanged with other plates having circular orifices of different diametric sizes for checking the straightness of tubes of different diameter sizes.

The gauging mechanism 44 also includes an electrical circuit 76 having indicating means, such as a lamp 78, powered by a lower voltage d.c. source 80 in the circuit. The circuit 76 is adapted to provide an indication of the detection of an out-of-straightness condition. In particular, the gauge plate 60, also being composed of stainless steel, is electrically conductive and together with an electrically conductive clip 82 attached on the retainer member 64 which contacts the plate 60, and along with leads 84,86,88, which respectively electrically interconnect the clip 82 and the lamp 78 and d.c. source 80, and the d.c. source 80 and support bracket 68, are included in the circuit 76. When a tube 23 being bent more than the maximum amount allowed contacts the gauge plate 60 as it passes through its gauging orifice 74 and being in simultaneous contact with any of the plurality of bearings sets 48, the circuit is closed by the tube 23 moving along the linear path P and the lamp 78 is turned on, providing a visual indication of the existence of an out-of-straightness condition greater than the tolerated amount. On the other hand, when the straightness of the tube is within tolerance, it does not contact the gauge plate 60 as it passes through the gauging orifice 74, and, therefore, the circuit 76 remains open and the lamp 78 turned off. An audible indication, such as an alarm bell, could be substituted in place of the lamp 78.

Figure 8:
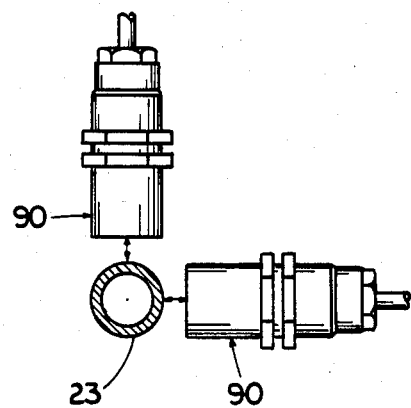
FIG. 8 is a top plan view of the precision measurement gauging mechanism of FIG. 7, but showing only the proximity sensors of the mechanism relative to a fuel rod tube.
Figure 7:
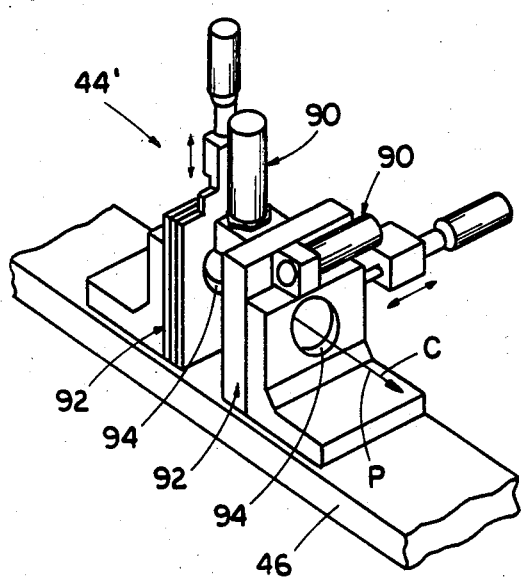
FIG. 7 is a fragmentary perspective view of an alternative embodiment of the tube straightness checking apparatus of the present invention, being similar to the preferred embodiment of FIG. 3 except that a precision measurement gauging mechanism is utilized.

The alternative "precision measurement" type gauging mechanism 44', as depicted in FIGS. 7 and 8 includes a pair of analog proximity sensors 90 being disposed along the linear path P and operable to detect any deviation of the tube from the imaginary centerline C which is generally coincident with the linear path P. (The sensors can be the ones available from Turck.) The gauging mechanism 44' also includes a pair of adjustable support members 92, which can take the form of micrometer positioning slides, for example, Model 1201X by Delstrom. The support members 92 mount the sensors 90 in an orthogonal (vertical and horizontal) relationship such that deviation in both "x" and "y" coordinate directions is detected. The support members 92 also have openings 94 defined therein through which the tube 23 passes as it is moved along the linear path P. The support members 92 are respectively adjustable in horizontal and vertical directions to provide for precise transverse adjustment of the sensors 90 with respect to the tube's linear path P.

The micrometer slides 92 are adjusted to place their respective sensors 90 at the middle of their effective range as related to the tube size being measured. Set up and calibration can be verified with tube masters of known straightness. As the tube passes between the sensors 90, its deviation from centerline is indicated. Specifically, the sensors 90 produce a voltage, being proportional to the vertical and horizontal distance between the tube and the respective sensor, which provides a measure of deviation from the centerline C, or condition of straightness. The resulting analog voltage is processed by suitable conventional electrical equipment (not shown), so that it can be amplified, controlled and directed to a meter, printer, or strip chart recorder as desired.

It is thought that the present invention and many of its attendant advantages will be understood from the foregoing description and it will be apparent that various changes may be made in the form, construction and arrangement thereof without departing from the spirit and scope of the invention or sacrificing all of its material advantages, the form hereinbefore described being merely a preferred or exemplary embodiment thereof.

We claim:

1. A tube straightness checking apparatus, comprising:
   (a) means for receiving and guiding a tube along a generally linear path; and
   (b) a gauging mechanism disposed along said linear path and being operable to check the straightness of the tube as it is moved along said path past said mechanism by detecting deviation greater than a predetermined amount of the tube from an imaginary centerline which is generally coincident with said linear path;
   (c) said gauging mechanism including a gauge plate with a circular gauging orifice defined therein through which the tube passes as it is moved along said linear path, said gauging orifice having a center aligned coincident with said imaginary centerline of the tube and being of a predetermined diametric size which establishes the out-of-straightness tolerance for the tube;
   (d) said gauging mechanism also including a holder member releasably mounting said gauge plate across said linear path whereby said gauge plate can be interchanged with other plates having circular orifices of different diametric sizes for checking the straightness of tubes of different diameter sizes.

2. A tube straightness checking apparatus, comprising:
   (a) means for receiving a guiding a tube along a generally linear path; and
   (b) a gauging mechanism disposed along said linear path and being operable to check the straightness of the tube as it is moved along said path past said mechanism by detecting deviation greater than a predetermined amount of the tube from an imaginary centerline which is generally coincident with said linear path;
   (c) said gauging mechanism including a gauge plate with a circular gauging orifice defined therein through which the tube passes as it is moved along said linear path, said gauging orifice having a center aligned coincident with said imaginary centerline of the tube and being of a predetermined diametric size which establishes the out-of-straightness tolerance for the tube;
   (d) said gauging mechanism also including an electrical circuit having indicating means operable to provide an indication of the detection of an out-of-straightness condition, said gauge plate being electrically conductive and forming part of said electrical circuit, said indicating means being operated to provide said indication upon the tube contacting said gauge plate as the tube moves along said linear path through said gauging orifice of said plate.

3. The apparatus as recited in claim 2, wherein said indicating means is a light which is turned on upon the tube contacting said gauge plate and thus provides said indication of the detection of an out-of-straightness condition.

4. A tube straightness checking apparatus, comprising:
   (a) means for receiving and guiding a tube along a generally linear path; and
   (b) a gauging mechanism disposed along said linear path and being operable to check the straightness of the tube as it is moved along said path past said mechanism;
   (c) said gauging mechanism including a pair of orthogonally arranged analog proximity sensors disposed along said linear path and being operable to detect deviation of the tube from an imaginary centerline which is generally coincident with said linear path;
   (d) said gauging mechanism also including a pair of adjustable support members, each of said support members mounting one of said sensors and having an opening defined therein through which the tube passes as it is moved along said linear path.

5. The apparatus as recited in claim 4, wherein said tube receiving and guiding means includes a plurality of sets of bearings, some of said bearing sets being disposed on a tube entry side of said gauging mechanism and other of said sets being disposed on a tube exit side of said gauging mechanism, said bearing sets together defining said linear path along which the tube is guided past said gauging mechanism.

6. The apparatus as recited in claim 5, wherein each of said bearing sets is in the form of a set of linear bearings being adjustable by rotation of said set as a unit in order to accommodate tubes of different diameter sizes.

7. The apparatus as recited in claim 5, wherein said receiving and guiding means includes a base on which is mounted said gauging mechanism and also said bearing sets in spaced apart relationship therealong and on said respective tube entry and exit sides of said mechanism.

8. The apparatus as recited in claim 7, wherein each of said bearing sets is adjustably mounted on said base for adjusting the position thereof along said linear path of the tube.

9. A tube straightness checking apparatus, comprising:
   (a) means for receiving and guiding a tube along a generally linear path; and
   (b) a gauging mechanism disposed along said linear path and being operable to check the straightness of the tube as it is moved along said path past said mechanism, said gauging mechanism being operable to detect deviation greater than a predetermined amount of the tube from an imaginary centerline which is generally coincident with said linear path;
   (c) said tube receiving and guiding means including a plurality of sets of bearings, some of said bearing sets being disposed on a tube entry side of said gauging mechanism and other of said sets being disposed on a tube exit side of said gauging mechanism, said bearing sets together defining said linear path along which the tube is guided past said gauging mechanism;
   (d) said gauging mechanism including a gauge plate with a circular gauging orifice defined therein through which the tube passes as it is moved along said linear path, said circular gauging orifice having a center aligned coincident with said imaginary centerline of the tube and being of a predetermined diametric size which establishes the out-of-straightness tolerance for the tube;
   (e) said gauging mechanism also including a holder member releasably mounting said gauge plate across said linear path whereby said gauge plate can be interchanged with other plates having circular orifices of different diametric sizes for checking the straightness of tubes of different diameter sizes.

10. The apparatus as recited in claim 9, wherein said gauging mechanism includes an electrical circuit having indicating means operable to provide an indication of the detection of an out-of-straightness condition, said gauge plate being electrically conductive and forming part of said electric circuit, said indicating means being operated to provide said indication upon the tube contacting said gauge plate as the tube moves along said linear path through said gauging orifice of said plate.

11. The apparatus as recited in claim 9, wherein each of said bearing sets is in the form of a set of linear bearings being adjustable by rotation of said set as a unit in order to accommodate tubes of different diameter sizes.

12. A tube straightness checking apparatus, comprising:
   (a) means for receiving and guiding a tube along a generally linear path; and
   (b) a gauging mechanism disposed along said linear path and being operable to check the straightness of the tube as it is moved along said path past said mechanism, said gauging mechanism being operable to detect deviation greater than a predetermined amount of the tube from an imaginary centerline which is generally coincident with said linear path;
   (c) said tube receiving and guiding means including a plurality of sets of bearings, some of said bearing sets being disposed on a tube entry side of said gauging mechanism and other of said sets being disposed on a tube exit side of said gauging mechanism, said bearing sets together defining said linear path along which the tube is guided past said gauging mechanism;
   (d) said gauging mechanism including a pair of analog proximity sensors disposed along said linear path and being operable to detect deviation of the tube from said imaginary centerline which is generally coincident with said linear path;
   (e) said gauging mechanism also including a pair of adjustable support members, each of said support members mounting one of said sensors in generally orthogonal relationship to the other and having an opening defined therein through which the tube passes as it is moved along said linear path.

13. The apparatus as recited in claim 12, wherein each of said bearing sets is in the form of a set of linear bearings being adjustable by rotation of said set as a unit in order to accommodate tubes of different diameter sizes.

* * * * *